United States Patent [19]

Ullrich et al.

[11] Patent Number: 4,490,065
[45] Date of Patent: Dec. 25, 1984

[54] SPLICE LOCKING DEVICE

[75] Inventors: Ray D. Ullrich, Houston; Douglas C. Sherman, Conroe; Leo Licon, Jr., Houston, all of Tex.

[73] Assignee: Combustion Engineering, Inc., Windsor, Conn.

[21] Appl. No.: 450,417

[22] Filed: Dec. 16, 1982

[51] Int. Cl.³ .............................................. B25G 3/00
[52] U.S. Cl. .................................. 403/379; 403/408; 411/400
[58] Field of Search ............. 403/408, 378, 379, 108, 403/109; 411/400, 401, 378

[56] References Cited

U.S. PATENT DOCUMENTS

| | | | |
|---|---|---|---|
| 1,426,098 | 8/1922 | Pruitt | 411/368 |
| 2,484,401 | 10/1949 | Coie | 403/108 X |
| 3,186,293 | 6/1965 | Curry | 411/401 |
| 3,211,482 | 10/1965 | Sorenson | 403/108 |
| 3,303,735 | 2/1967 | Fisher | 411/400 |
| 3,463,525 | 8/1969 | Stewart | 411/400 X |

*Primary Examiner*—Andrew V. Kundrat
*Attorney, Agent, or Firm*—Troxell K. Snyder

[57] ABSTRACT

A locking device (1) for use with joints between two telescoping members (28,30) include a bushing (2) with an enlarged head (8) and a neck (6) for inserting into a pair of aligned holes (34) in the telescoping members (28,30). The device is locked by drawing a bolt (16) into the central bore (10) of the bushing (2) by drawing means (20,22,24). The bolt (16) includes a lug (18) for contacting the inner telescoping member (28). Also provided is a channel (14) in the neck (6) which permits the lug (18) to slide within the bushing (2), thus allowing effective engagement of the device (1) for a range of telescoping member wall thicknesses.

4 Claims, 7 Drawing Figures

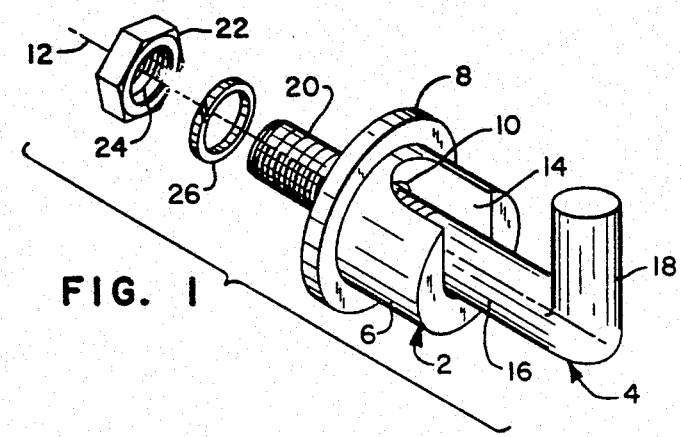
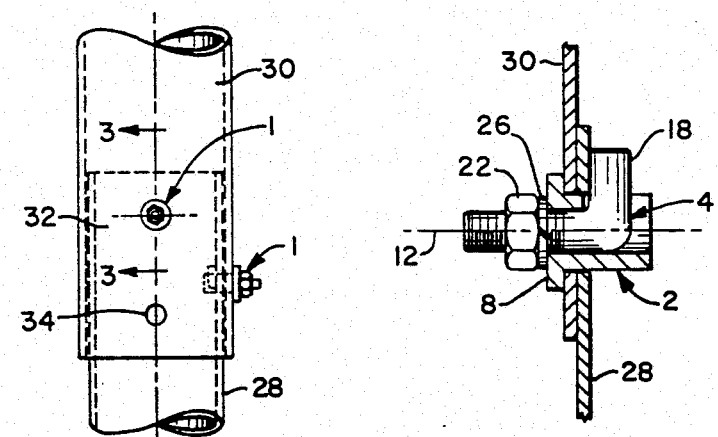
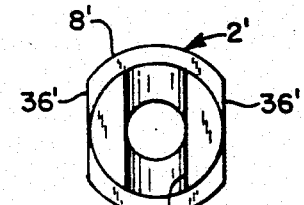
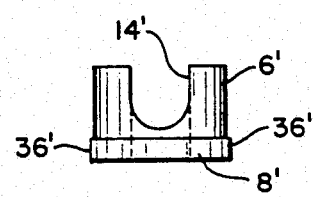
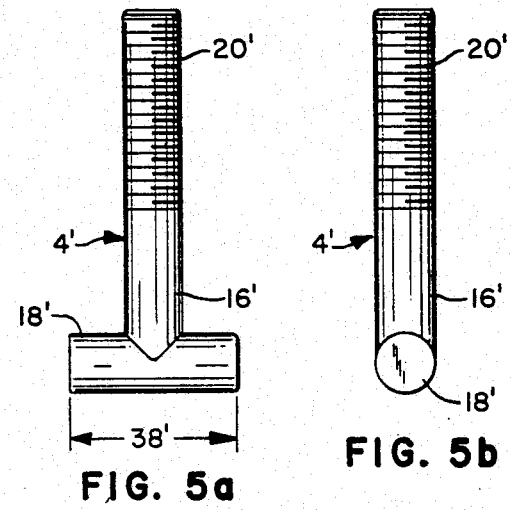

SPLICE LOCKING DEVICE

FIELD OF THE INVENTION

This invention pertains to a joint locking device and, more particularly, to a device for locking a splice between two telescoping members.

BACKGROUND OF THE INVENTION

The use of a pair of telescoping members to form one long structure is well known in the art. Each member has a substantially hollow cross-section of similar shape, with one member being sized to slide at least partially into the other, thus forming an overlap joint. These members frequently find use in pole structures for electrical transmission line support. The members are designed to be easily transported to the site and quickly erected to form a strong, weather proof structure.

In a typical transmission pole structure, a pair of thin walled, concentric tubular members are joined at the erection site to form one extended pole. The joint, or splice, between the two tubes is secured by field welding around the joint circumference or by through bolts which pass through holes drilled in the tubular members.

Due to the nature of the service of these transmission pole structures, the individual tubular members are generally painted or galvanized before transportation to the erection site. Since field welding of the joint may compromise the galvanized or painted coating, allowing possible corrosion of the structure, the through bolt is presently the preferred method for locking the splice joint.

The use of a through bolt to lock a splice joint in a transmission pole structure requires individual fabrication of the through bolts for each type of transmission pole members, an expensive process which results in a large inventory of different length through bolts for the various types of structures. There is a need in this area for a device which may quickly lock a wide variety of transmission pole structures without welding and without compromising the protective paint or galvanizing.

SUMMARY OF THE PRESENT INVENTION

The present invention provides a device for locking a splice between a pair of telescoping members. According to the present invention, the device comprises a bushing which is inserted into a pair of predrilled aligned holes in the members. The bushing has an enlarged head end which contacts the outside surface of the exterior member, a neck portion which closely fits within the drilled holes, and a central bore running the entire length of the bushing.

The present invention also provides a bolt member disposed slidingly within the bore and having a projecting lug which extends radially outward from the bushing neck. In practice, the neck and lug ends of the bushing and bolt are inserted into the aligned holes in the pair of telescoping members. The bolt is then drawn through the central bore causing the lug to contact the inside surface of the interior member, thus locking the device firmly in place. The invention provides a series of screw threads about the end of the bolt opposite the lug end for drawing the bolt through the central bore.

Another feature of this invention is provided by a longitudinal channel in the bushing neck in the preferred embodiment of the invention. This channel, which includes the central bore, permits the lug portion of the bolt to move longitudinally within the bushing. This feature allows the device according to the present invention to be used with a wide variety of different member wall thicknesses and still be effectively locked in position.

A number of these splice locking devices may be used about the circumference of the splice, depending on the strength required for the particular joint. Since the devices do not require welding to lock the splice, the exterior galvanized or other weather resistant coating is not compromised. The lock device is easily installed and may be quickly released at a later time if desired. The devices further have the advantage of being able to fit a wide variety of telescoping members, regardless of the diameter and may be easily fabricated with neck diameters of 1.5 inches (3.8 cm) or larger for avoiding high local stresses in the member walls.

The device according to the present invention thus provides a simple, effective means for locking the splice between a pair of telescoping members which does not require access to the interior of the telescoping members, does not require welding and does no harm to any galvanizing, paint, or other coating present on the members.

BRIEF DESCRIPTION OF THE DRAWINGS

FIG. 1 shows an isometric view of the preferred embodiment according to the present invention.

FIG. 2 shows the present invention installed in a pair of telescoping concentric tubular members.

FIG. 3 shows a cross-sectional view of the device according to the present invention in an engaged state.

FIGS. 4a and 4b show an alternative embodiment of the bushing member.

FIGS. 5a and 5b show an alternative embodiment of the bolt member.

DESCRIPTION OF THE PREFERRED EMBODIMENT

Referring now to FIG. 1, the principle components of the device are shown as including a bushing 2, a bolt 4 and tightening means 22. The bushing has a neck 6 with a diameter sized to fit closely within aligned holes in the telescoping members. One end of the bushing 2 has an enlarged head 8 which has a diameter greater than the neck portion 6. A central bore 10 passing along the centerline 12, and a longitudinal channel 14 complete the preferred bushing configuration.

Fitting slidingly in the bore 10 and channel 14 of the bushing 2 is the shank portion 16 of the bolt 4. The bolt 4 further includes a lug 18 disposed adjacent to the end of the bolt 4 which is in proximity to the neck portion 6 of the bushing 2. The lug portion 18 extends radially outward from the centerline 12 of the shank 16 to a radial distance greater than that of the neck portion 6 of the bushing 2.

Also provided, according to the present invention, is a means for drawing the bolt, specifically the lug end, toward the head and into the bushing. In the preferred embodiment, this means comprises a series of screw threads 20 at the end of the bolt 4 opposite the lug end 18 and a nut 22 having corresponding internal threads 24 for engaging the bolt threads 20. An optional lock washer 26 is shown for preventing loosening of the splice locking device during use.

A typical splice joint between two concentric tubular members is shown in FIG. 2. The interior tubular member 28 and exterior tubular member 30 are shown in telescoping arrangement with the overlapping ends forming the joint area 32. The walls of the tubular members contain a series of corresponding, equal diameter holes 34 disposed about the circumference of the joint 32. During erection the tubular members 28,30 are positioned as desired with the corresponding holes 34 in alignment. The assembled splice locking device 1 as shown generally in FIG. 1 is inserted with the lug 18 and neck end 6 first into the joint with the head 8 placed adjacent to the exterior surface of the exterior tube 30.

In the preferred embodiment, the nut 22 is then tightened so as to draw the lug 18 into the bushing 2 thus contacting the interior member 28. This tightening results in compression of the exterior member 30 and the interior member 28 between the head 8 of the bushing and the lug 18 of the bolt as shown in FIG. 3. The presence of the bushing 2 and the bolt 4 in the aligned holes 34 prevents relative longitudinal motion of the tubular members 28,30. The joint is now firmly but releasably locked without the need for welding and without the need for access to the interior portion of the members 28,30.

FIGS. 4a and 4b shown an alternative embodiment of the bushing 2' wherein the channel 14' extends completely across the neck portion 6' in the transverse direction. The head portion 8' is also shown as having flats 36' to facilitate holding the bushing 2' when tightening the nut 22', thus preventing rotation of the bushing during the engagement process.

FIGS. 5a and 5b shown a bolt 4' for use with the bushing of FIGS. 4a and 4b. This bolt 4' has a double ended lug 18' which is configured to contact the interior member 28' at two points when engaged. The span 38' of this T-shaped bolt 4' is therefore greater than the diameter of the holes 34 in the tubular members 28,30 shown in FIG. 2.

The splice locking device according to the present invention therefore represents a simple, effective means for engaging and locking two or more telescoping tubular members. It is to be appreciated that the shape of the bushing 2' and bolt 4' members need not be only as appears in the appended drawings, but may include a wide variety of cross-sections such as square, rectangular, hexagonal, as well as round, and that such variations in shape also apply to the head 8 of the bushing 2. Furthermore, it is also to be appreciated that although the telescoping members 28,30 have been referred to as tubular throughout the above specification, this designation is meant not only to include those members with a circular cross-section, but also those having a square, rectangular, or other cross-section, either open or closed, which is resistant to transverse deformation.

We claim:

1. A device for locking a joint between two telescoping members, each member having a hole aligned with the corresponding hole in the other member, comprising:
    a bolt, having a shank portion and a projecting lug portion adjacent one end, the lug and shank forming a T-shape extending radially outward from the shank portion and having a span greater than the diameter of said holes, for contacting the inner telescoping member;
    a bushing, having a neck for fitting within said aligned holes and an enlarged head disposed adjacent to one end for contacting the outer telescoping member, the bushing further including a central bore running the entire length of the bushing for slidingly receiving the shank portion of the bolt therewithin, and a channel, disposed in the neck portion of the bushing, and extending diametrically across the bushing neck for allowing longitudinal movement of the lug within the bushing neck, and means cooperating with the bushing for drawing the lug toward the head of the bushing, thereby locking said device in said holes.

2. A device for locking a joint as recited in claim 1, wherein the bolt further includes screw threads disposed about the end of the bolt opposite the lug wherein the means for drawing the bolt into the bushing comprises internally threaded nut for engaging the bolt threads.

3. A device for locking a splice between two concentric, closely fitting cylinders, each cylinder having a hole in the wall thereof in alignment with a corresponding hole in the wall of the other cylinder, comprising:
    a bolt, having a shank portion and a projecting lug adjacent one end, the lug extending radially outward beyond the neck portion and forming, with the shank, a T-portion having a span greater than the diameter of said holes, for contacting the inner cylinder member;
    a bushing, having a neck for fitting within said aligned holes and an enlarged head disposed adjacent to one end for contacting the outer cylinder, further including a central bore running the entire length of the bushing for slidingly accepting the shank portion of the bolt therewithin, and a channel, disposed in the neck portion of the bushing and extending diametrically across the bushing neck for allowing longitudinal movement of the lug within the bushing neck, and means cooperating with the bushing for drawing the lug toward the head of the bushing, thereby locking said device in said holes.

4. A device for locking a splice between two concentric, closely fitting cylinders as recited in claim 3, wherein the bolt further includes screw threads disposed about the end of the bolt opposite the lug and wherein the means for drawing the bolt into the bushing comprises internally threaded nut for engaging the bolt threads.

* * * * *